Nov. 17, 1964  G. K. MEDICUS ETAL  3,157,055
VARIABLE LINEAR POSITIONER
Filed March 17, 1964  2 Sheets-Sheet 1
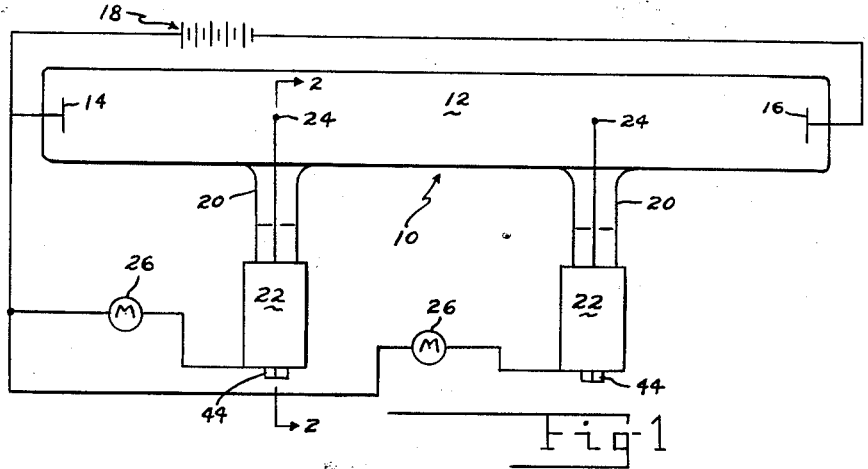
Fig-1
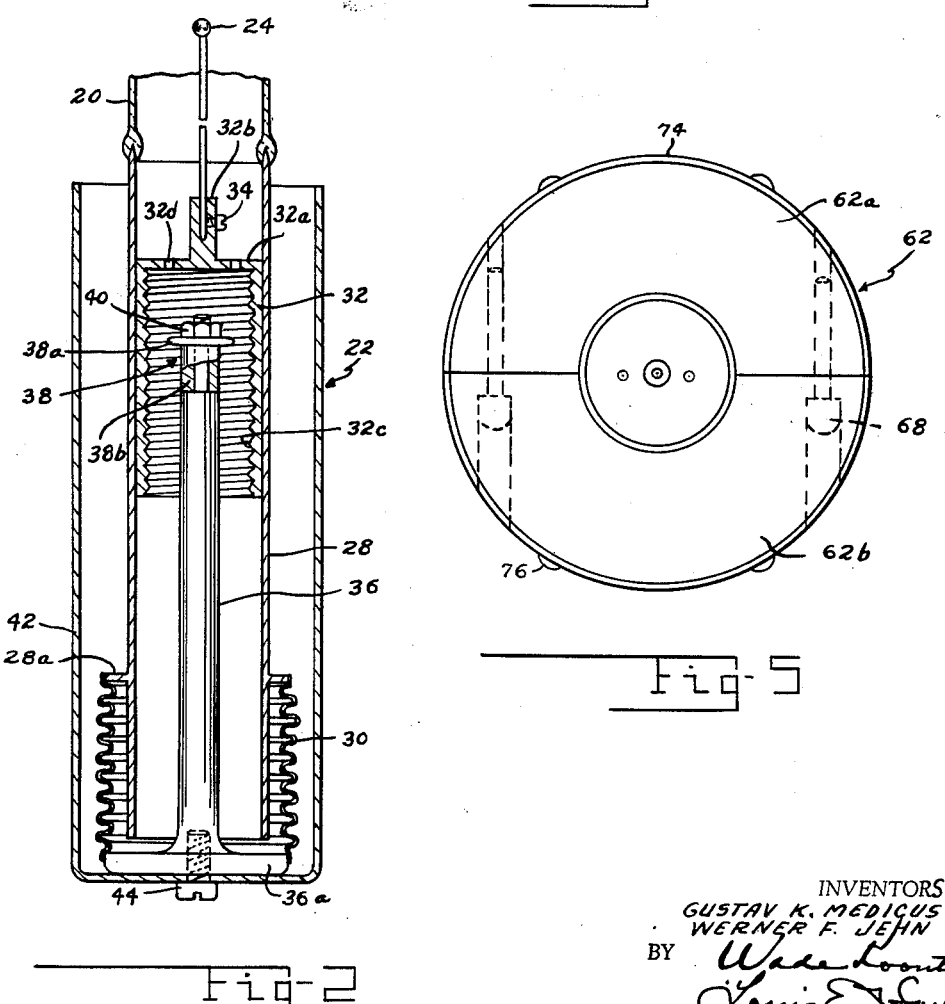
Fig-2
Fig-5
INVENTORS
GUSTAV K. MEDICUS
WERNER F. JEHN
BY
ATTORNEYS Nov. 17, 1964  G. K. MEDICUS ETAL  3,157,055
VARIABLE LINEAR POSITIONER
Filed March 17, 1964                    2 Sheets-Sheet 2

INVENTORS
GUSTAV K. MEDICUS
WERNER F. YEHN
BY
ATTORNEYS

United States Patent Office 3,157,055
Patented Nov. 17, 1964

3,157,055
VARIABLE LINEAR POSITIONER
Gustav K. Medicus, 7521 W. Hyland Ave., and Werner F. Jehn, 438 Twinning Drive, both of Dayton, Ohio
Filed Mar. 17, 1964, Ser. No. 352,697
12 Claims. (Cl. 74—18.1)
(Granted under Title 35, U.S. Code (1952), sec. 266)

The invention described herein may be manufactured and used by or for the Government for governmental purposes without the payment to us of any royalty thereon.

This invention relates to devices for generating a linear motion, and particularly to such devices for use on pressure and vacuum vessels and which must be absolutely leakproof under both pressure and vacuum conditions; and which must further be capable of withstanding high temperatures.

While not limited to such application, and for purposes of illustration, the positioner of this invention will be shown and described in connection with a glass high vacuum vessel apparatus used in the conduct of gaseous electronic research.

Gaseous electronic research is often conducted with fragile glass vessel apparatus which must be vacuated to an extremely high vacuum while being heated or "baked out" at high temperature in order to purge the entire interior, including the walls, of residual gas which would contaminate the test gas to be introduced into the apparatus. The positioner of the present invention will be shown and described as being laterally fused to an elongated glass tube capable of carrying a flow of electrons and ions; the positioner being used to move a probe to various positions within the electronic flow in order to check plasma properties at various lateral positions within the tube. The necessary apparatus required to evacuate the elongated glass tube does not constitute a portion of this invention and is omitted for the sake of brevity.

It is apparent that on any apparatus operating at high pressure or vacuum, the problem of seals can become most frustrating. This is particularly true on vacuum apparatus under conditions where it is imperative that an uncontaminated environment be maintained within the apparatus. Any leakage would permit a passage of ambient gas into the apparatus; causing contamination and ruination of the experiments in progress.

Various expedients are used to prevent leakage into a vacuum apparatus, while permitting the external positioning of an internal device within the apparatus itself. One common method in almost universal use is to have the internal device in an appending glass tube and positioning the device by external magnetic means such as a hand held magnet. This means is all too often very undesirable because fine position adjustments cannot be made. Another problem encountered on magnetically positioned devices is the difficulty of repeatedly adjusting the device to any given position.

One object of the present invention is to provide a mechanical positioner which is leakproof on high vacuum applications.

Another object of the present invention is to provide a positioner which when attached to glass apparatus can withstand temperatures on the order of 500° C.

A further object of the present invention is to provide a linear mechanical positioner having an infinite number of positions.

Yet another object of the present invention is to provide a linear mechanical positioner requiring no sliding seals between elements.

Additional objects, advantages and features of the invention reside in the construction, arrangement and combination of parts involved in the embodiment of the invention as will appear from the following description and accompanying drawings, wherein:

FIG. 1 shows a simple glass vessel apparatus for the conduct of electronic research and having two positioners in accordance with one embodiment of this invention fused thereto;

FIG. 2 is an enlarged cross section taken on line 2—2 of FIG. 1 and showing the construction details of the positioner;

FIG. 5 is a plan view of FIG. 4.

Figure 3:
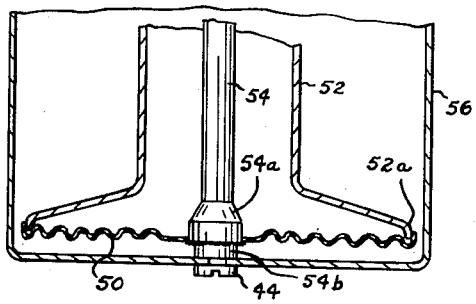
FIG. 3 is a fragmentary cross section similar to that of FIG. 2 and showing a second embodiment of the invention.

Referring to FIG. 1 of the drawing, there is shown a greatly simplified glass apparatus 10 which may be used in the conduct of gaseous electronic research. The apparatus 10 has an elongated tube portion 12 having closed ends containing an anode 14 and a cathode 16 for a flow of electrons and ions through the elongated tube. Any adequate source of electrical energy may be used; as symbolized by a power pack 18. Laterally extending from the elongated tube 12 are one or more lateral tubes 20 at selected positions. The outer end of each lateral tube 20 is fused to a positioner 22 made in accordance with this invention.

As shown on FIG. 1, each positioner 22 has joined thereto a terminal element such as a probe 24 which may be laterally positioned across the elongated tube 12 in order to plot desired characteristics at various positions in the electrical flow within the tube. The characteristics are indicated on, or are calculatable from suitable meters 26 shown in the schematic wiring circuit. Since the entire positioner is metallic, suitable electrical connection may be made at any convenient position, such as under screw 44 as shown. Referring more specifically to FIG. 2, the positioner 22 has a mounting and guide tube 28; the forward end of which is shown fused to a lateral glass tube 20. Toward the opposite or rear end of the mounting and guide tube 28 is a flange 28a to which one end of a flexible sealing member such as co-axially surrounding bellows 30 is joined. This juncture must be absolutely leakproof and may be made by brazing with a high temperature metal or alloy.

Axially slidable within the mounting and guide tube 28 is a thimble 32 having a closed end 32a from which a shank 32b extends outwardly. The sliding fit of the thimble in the tube should preferably have enough friction to maintain good electrical connection. If desired, any of numerous means well known to the art may be used to prevent rotation of the thimble in the tube. The shank 32b contains an axial bore for receiving the end of probe 24 which is removably held in place by screw 34. The thimble is axially threaded with internal threads 32c; the purpose of which will be hereinafter described. The closed end 32a of the thimble contains one or more pressure balancing passages 32d.

Coaxial with and having a forward end extending into the rear end of the mounting and guide tube 28 is an actuating rod 36, having at the rear or outer end thereof, an enlarged diameter flange 36a having at least as large a diameter as that of the mounting and guide tube. The rear open end of the axially extending bellows 30 is secured in any leakproof manner to flange 36a on the actuating rod 36. The bellows may be joined in any desired manner assuring a leakproof nonrotatable connection; however, brazing is preferred. The reason for the preference is to enable the subsequent severance of this connection when it is desired to replace the probe 24 to some other configuration while the positioner is fused to the apparatus. It is noted on FIG. 2 that the mounting and guide tube 28 is of such length as will limit the bellows contraction under high vacuum by limiting the forward travel of the actuating rod 36.

Joined to the front or forward end of actuating rod 36 is a disc member 38 retained in rotatable position by any convenient means such as nut 40. The disc member 38 is provided with a disc 38a having a diameter somewhat less than the inside diameter of the internal threads in thimble 32, and is of rather thin thickness to enable the disc to tangentially engage and act as a "male thread" within the internal threads of the thimble. The disc member 38 is preferably provided with a tubular shank 38b coaxially extending rearward from the rear face of disc 38a and engaging a reduced diameter portion at the forward end of actuating rod 36 as shown. The construction shown and described provides stability of the disc member on the actuating rod, while permitting free rotation of the disc member.

The above described elements of the positioner are coaxially surrounded by a deep-drawn cylindrical actuating handle 42 which is open at the forward end and closed at the rear end. The actuating handle is joined to the rear of the actuating rod 36 by means of screw 44 which engages a blind tapped hole in the end of the actuating rod.

When the positioner is fused to the apparatus as shown, bellows 30 performs two functions: (1) seals the open end of the mounting and guide tube 28 to the actuating rod 36 to seal the tube opening, and (2) permits canting movement of the actuating handle 42 and actuating rod 36 in relation to the mounting and guide tube 28.

Figure 4:
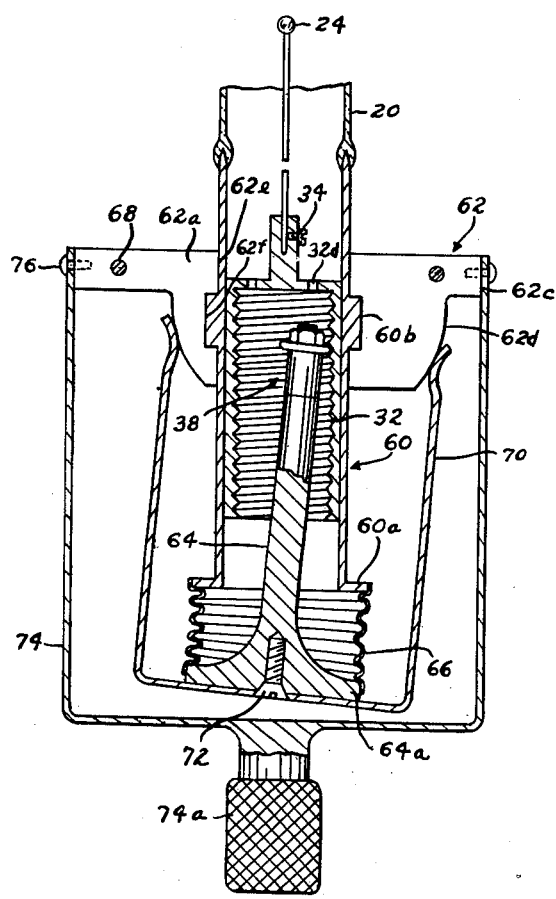
FIG. 4 is another cross section similar to that of FIG. 2 and showing a third embodiment of the invention.

In operation, the thimble 32 may easily be axially positioned within the mounting and guide tube by laterally manipulating the actuating handle to bring the disc member into tangential engagement with the internal threads in the thimble, as shown on FIG. 4; and then further manipulating the actuating handle with a wobbling motion to cause the disc member to follow the thread helix in the thimble. The operation of the positioner has been found to be very smooth and the thimble may be repeatedly adjusted to an infinite number of positions. When the positioners are mounted to be in a horizontal position on the apparatus, no difficulty has been encountered with the thimble creeping in the mounting and guide tube.

Although the positioner is shown and described as positioning a probe for the purpose of measuring a potential or other characteristic at a given point, the positioner may be used to position other terminal elements such as anodes and cathodes, grids, filaments, masks, targets, and specimens. Likewise, the positioner of this invention may be used with any vacuum or pressure apparatus without regard to the purpose of the apparatus.

A second embodiment of the invention is shown on FIG. 3; like elements having like numerals. The major difference between embodiments is in the substitution of a flat diaphragm 50 for the bellows 30. The mounting and guide tube 52 is similar to mounting and guide tube 28 in the portions not shown on FIG. 3. At the outer or rear end, the mounting and guide tube 52 is outwardly flared to form a rim portion 52a to which the periphery of diaphragm 50 is joined in a leakproof manner as previously described. The outer or rear end of actuating rod 54, which is likewise similar to actuating rod 36 in the portions not shown in FIG. 3, is provided with a flanged portion 54a providing support at the central portion of the diaphragm; and terminates in shank 54b which passes through a hole at the axis of the diaphragm. The diaphragm is joined to the rear end of the actuating rod 54 in a leakproof nonrotatable manner as previously described. The actuating handle 56 is similar to actuating handle 42 on FIG. 2 and is held in place by screw 44.

As shown on FIG. 3, the relative axial movement of the actuating rod 54 in relation to the mounting and guide tube 52 under high vacuum conditions, is limited by the "bottoming" of the rim portion 52a of the mounting and guide tube against the inner closed end of the actuating handle 56. The positioner is manipulated in the manner previously described.

A third embodiment of the invention is depicted by FIG. 4 and FIG. 5; like elements with elements of FIG. 2 having like numerals. The major feature of the third embodiment is to surround a positioner of the general character shown on FIG. 2 with an actuating mechanism which will maintain the tangential engagement of the disc member 38 with the thimble 32, and permit manipulation with a circular instead of a wobbling motion.

Referring to FIG. 4, the mounting and guide tube 60, at the outer or rear end, is provided with a flange 60a. Toward the inner or forward end of the tube is an integral outwardly extending circumferential flange 60b which is used to axially locate and maintain the position of the eccentric disc 62 which will be subsequently described. The actuating rod 64 is similar to the actuating rod of the embodiment shown on FIG. 2 and terminates at the rear end in an enlarged diameter flange 64a. A bellows 66 is joined between the mounting and guide tube 60 and the actuating rod 64 in a leakproof nonrotatable manner as previously described.

The eccentric disc 62 comprises two axially split halves 62a and 62b as best shown on FIG. 5. The two split halves are joined to form a unit structure, by means of screws 68, in the well known manner shown on FIG. 5 which need not be further described. The eccentric disc 62, as shown on FIG. 4, has a circular flange 62c from the lower face of which extends a spherical element 62d laterally displaced to be eccentric with the axis of circular flange 62c. The circular flange 62c contains an axial bore 62e and a counterbore 62f sized to rotatably fit, with very little clearance, the mounting and guide tube 60 with flange 60b thereon. It is thus noted that when the two halves comprising the eccentric disc 62 are joined to surround the mounting and guide tube 60, and the eccentric disc is rotated about the tube, the spherical element 62d will rotate in an eccentric manner about the tube.

The socket member 70 is somewhat similar to the actuating handle 42 of the embodiment shown on FIG. 2 and the actuating handle 56 in the embodiment shown on FIG. 3, in that it is a deep-drawn cylindrical structure which is closed at one end. The socket member 70 surrounds the rear ends of the mounting and guide tube 60 and the actuating rod 64, where it is axially held in place by means of a screw 72 which engages a blind tapped hole in the rear end of the actuating rod 64. The forward open end of socket member 70 is outwardly flared to provide a socket for engaging the spherical element of the eccentric disc 62 as shown.

It is obvious when the elements described are cooperatively sized and assembled as shown, the actuating rod 64 will be canted and disc member 38 will be held in engagement with the internal threads of thimble 32; and as the eccentric disc is rotated, the thimble 32 will be advanced or retracted in the mounting and guide tube 60. The flange 60b on the mounting and guide tube, which engages the counterbore 62f in the eccentric disc, prevents any axial movement of the disc in relation to the tube.

Although not absolutely necessary to the actuation of the third embodiment of the invention, it is desirable to surround the elements previously described with an actuating thimble 74, the open end of which is joined to the periphery of the eccentric disc by means of a plurality of screws or rivets 76. For convenience of rotation, the thimble has been provided with a knurled knob 74a protruding from the rear of the closed end of the thimble.

It is to be understood that the embodiments of the present invention as shown and described are to be regarded as illustrative only and that the invention is susceptible to variations, modifications and changes within the scope of the appended claims.

We claim:

1. A variable linear positioner adapted for attaching to and positioning a terminal element within a closed vessel and comprising: a mounting and guide tube having an open rear end and an open forward end for joining to a vessel, an internally threaded thimble axially slidable within said mounting and guide tube and having means at the closed end for supporting a forwardly extending terminal element, an actuating rod having a forward end extending into the rear end of said mounting and guide tube and into the open end of said thimble, means joined to the forward end of said actuating rod for engaging the internal threads of said thimble, sealing means for nonrotatably and in a leakproof manner joining said actuating rod to said mounting and guide tube, and actuating means joined to said actuating rod for manipulating said actuating rod to axially move said thimble in said mounting and guide tube.

2. A variable linear positioner adapted for attaching to and positioning a terminal element within a closed vessel and comprising: a mounting and guide tube having an open rear end and an open forward end for joining to a vessel, an internally threaded thimble axially slidable within said mounting and guide tube with the closed end thereof forward and having means forwardly projecting from the closed end for supporting a terminal element, an actuating rod having a forward end extending into the rear end of said mounting and guide tube and into the open end of said thimble, a disc member rotatably supported at the forward end of said actuating rod for tangentially engaging the internal threads of said thimble, sealing means for nonrotatably and in a leakproof manner joining said actuating rod to said mounting and guide tube, and actuating means joined to said actuating rod for manipulating said actuating rod to axially move said thimble in said mounting and guide tube.

3. A variable linear positioner adapted for attaching to and positioning a terminal element within a closed vessel and comprising: a mounting and guide tube having an open rear end and an open forward end for joining to a vessel, an internally threaded thimble axially slidable within said mounting and guide tube with the closed end thereof forward and having means at the closed end for supporting a forwardly extending terminal element, an actuating rod coaxial with and having a forward end extending into the rear end of said mounting and guide tube and into the open end of said thimble, a disc member having a diameter less than the inside diameter of the internal threads in said thimble and joined to the forward end of said actuating rod, sealing means for nonrotatably and in a leakproof manner joining said actuating rod to said mounting and guide tube, and an actuating handle means joined to said actuating rod for manipulating said actuating rod to bring said disc member into tangential engagement with the internal threads in said thimble and to axially slide said thimble in said mounting and guide tube by further manipulating said actuating handle means with a wobbling motion to cause the axially stationary disc member to follow the thread helix in said thimble.

4. A variable linear positioner adapted for attaching to and positioning a terminal element within a closed vessel and comprising: a mounting and guide tube having an open rear end and an open forward end for joining to a vessel, an internally threaded thimble axially slidable within said mounting and guide tube with the closed end thereof forward and having means at the closed end for supporting a forwardly extending terminal element, an actuating rod coaxial with and having a forward end extending into the rear end of said mounting and guide tube and into the open end of said thimble, a disc member rotatably joined to the forward end of said actuating rod, said disc member having a disc with a diameter less than the inside diameter of the internal threads in said thimble and of a thickness permitting tangential engagement with the helix of the internal threads in said thimble, sealing means for nonrotatably and in a leakproof manner joining said actuating rod to said mounting and guide tube, and an actuating handle means joined to said actuating rod for manipulating said actuating rod to bring the disc of said disc member into tangential engagement with the internal threads in said thimble and to axially slide said thimble in said mounting and guide tube by further manipulating said actuating handle means with a wobbling motion to cause the axially stationary disc on said disc member to rotationally follow the thread helix in said thimble.

5. A variable linear positioner in accordance with claim 4 in which said sealing means is a bellows.

6. A variable linear positioner in accordance with claim 4 in which said sealing means is a diaphragm.

7. A variable linear positioner adapted for attaching to and positioning a terminal element within a closed vessel and comprising: a mounting and guide tube having an open rear end and an open forward end for joining to a vessel, an internally threaded thimble axially slidable within said mounting and guide tube with the closed end thereof forward and having means at the closed end for supporting a forwardly extending terminal element, an actuating rod coaxial with and having a forward end extending into the rear end of said mounting and guide tube and into the open end of said thimble and further having a rear end terminating in a flange axially located to be to the rear of said mounting and guide tube and of sufficient diameter to be axially abuttable to the rear end of said mounting and guide tube to limit the forward axial movement of said actuating rod under extremely high vacuum conditions of operation, a disc member rotatably joined to the forward end of said actuating rod, said disc member having a disc with a diameter less than the inside diameter of the internal threads in said thimble and of a thickness permitting tangential engagement with the helix of the internal threads in said thimble, a bellows coaxially surrounding said mounting and guide tube with the forward end of said bellows joined to said mounting and guide tube and with the rear end of said bellows axially extending from the rear of said mounting and guide tube and joined to the flange of said actuating rod for nonrotatably and in a leakproof manner joining said actuating rod to said mounting and guide tube, and a cup-shaped actuating handle means coaxially surrounding said mounting and guide tube and joined to said actuating rod for manipulating said actuating rod to bring the disc of said disc member into tangential engagement with the internal threads in said thimble and to axially slide said thimble in said mounting and guide tube by further manipulating said actuating handle means with a wobbling motion to cause the axially stationary disc on said disc member to rotationally follow the thread helix in said thimble.

8. A variable linear positioner adapted for attaching to and positioning a terminal element within a closed vessel and comprising: a mounting and guide tube having an open rear end flared to terminate in an enlarged diameter rim and an open forward end for joining to a vessel, an internally threaded thimble axially slidable within said mounting and guide tube with the closed end thereof forward and having means at the closed end for supporting a forwardly extending terminal element, an actuating rod coaxial with and having a forward end extending into the rear end of said mounting and guide tube and into the open end of said thimble, a disc member rotatably joined to the forward end of said actuating rod, said disc member having a disc with a diameter less than the inside diameter of the internal threads in said thimble and of a thickness permitting tangential engagement with the helix of the internal threads in said thimble, a diaphragm coaxially joined to the enlarged diameter rim on said mounting and guide tube and to the rear end of said actuating rod for nonrotatably and in a leakproof manner joining said actuating rod to said mounting and guide tube, and a cup-shaped actuating handle means coaxially surrounding said mounting and guide tube and joined to said actuating rod for manipulating said actuating rod to bring the disc of said disc member into tangential engagement with the internal threads in said thimble and to axially slide said thimble in said mounting and guide tube by further manipulating said actuating handle means with a wobbling motion to cause the axially stationary disc on said disc member to rotationally follow the thread helix in said thimble.

9. A variable linear positioner adapted for attaching to and positioning a terminal element within a closed vessel and comprising: a mounting and guide tube having an open rear end, an open forward end for joining to a vessel and an integral outwardly extending circumferential flange, an internally threaded thimble axially slidable within said mounting and guide tube with the closed end thereof forward and having means at the closed end for supporting a forwardly extending terminal element, an actuating rod coaxial with and having a forward end extending into the rear end of said mounting and guide tube and into the open end of said thimble, a disc member having a diameter less than the inside diameter of the internal threads in said thimble and joined to the forward end of said actuating rod, sealing means for joining said actuating rod to said mounting and guide tube in a nonrotatable and leakproof manner, an eccentric disc means having a circular flange and a spherical element eccentric with the axis of the circular flange and extending from the rear face of the circular flange to provide a ball structure, said eccentric disc means being axially bored on the axis of the circular flange to concentrically and rotatably surround said mounting and guide tube and counterbored to be axially located and retained on the outwardly extending circumferential flange on said mounting and guide tube, and a cup-shaped socket member surrounding the rear end of said mounting and guide tube and abuttably and coaxially joined to the rear end of said actuating rod, said cup-shaped socket member being outwardly flared at the open end to provide a socket engaging the eccentric spherical element forming the ball structure on said eccentric disc means and thereby canting said actuating rod and bringing said disc member into tangential engagement with the internal threads in said thimble, the said thimble being axially moved in said mounting and guide tube by rotating said eccentric disc means to cause the axially stationary disc means to rotationally follow the thread helix in said thimble.

10. A variable linear positioner adapted for attaching to and positioning a terminal element within a closed vessel and comprising: a mounting and guide tube having an open rear end, an open forward end for joining to a vessel and an integral outwardly extending circumferential flange, an internally threaded thimble axially slidable within said mounting and guide tube with the closed end thereof forward and having means at the closed end for supporting a forwardly extending terminal element, an actuating rod coaxial with and having a forward end extending into the rear end of said mounting and guide tube and into the open end of said thimble and a rear end terminating in a flange, a disc member rotatably joined to the forward end of said actuating rod, said disc member having a disc with a diameter less than the inside diameter of the internal threads in said thimble and of a thickness permitting tangential engagement with the helix of the internal threads in said thimble, a bellows coaxial with said mounting and guide tube with the forward end of said bellows joined to said mounting and guide tube and with the rear end of said bellows axially extending from the rear of said mounting and guide tube and joined to the flange at the rear end of said actuating rod for nonrotatably and in a leakproof manner joining said actuating rod to said mounting and guide tube, an eccentric disc means having a circular flange and a spherical element eccentric with the axis of the circular flange and extending from the rear face of the circular flange to provide a ball structure, said eccentric disc means being axially bored on the axis of the circular flange to concentrically and rotatably surround said mounting and guide tube and counterbored to be axially located and retained on the outwardly extending circumferential flange on said mounting and guide tube, and a cup-shaped socket member surrounding the rear end of said mounting and guide tube and abuttably and coaxially joined to the rear end of said actuating rod, said cup-shaped socket member being outwardly flared at the open end to provide a socket engaging the eccentric spherical element forming the ball structure on said eccentric disc means and thereby canting said actuating rod and bringing the disc on said disc member into tangential engagement with the internal threads in said thimble, the said thimble being axially moved in said mounting and guide tube by rotating said eccentric disc means to cause the axially stationary disc on said disc means to rotationally follow the thread helix in said thimble.

11. A variable linear positioner in accordance with claim 10 in which said eccentric disc means is axially split into two halves and is provided with retaining means for joining the two halves.

12. A variable linear positioner in accordance with claim 10 in which: (a) said eccentric disc means is axially split into two halves and is provided with retaining means for joining the two halves, and further having, (b) an actuating thimble means coaxial with said mounting and guide tube and joined at the open end to the circular flange on said eccentric disc means for rotating said eccentric disc means.

References Cited by the Examiner

UNITED STATES PATENTS

| | | | |
|---|---|---|---|
| 1,992,212 | 2/35 | Horne | 74—18.1 X |
| 3,004,439 | 10/61 | Ross | 74—18.1 |

BROUGHTON G. DURHAM, *Primary Examiner.*